(12) United States Patent
Poiret et al.

(10) Patent No.: US 6,849,012 B2
(45) Date of Patent: Feb. 1, 2005

(54) TENSIONER FOR A CHAIN OR BELT

(75) Inventors: Christian Poiret, Coulogne (FR); Alexandre Charton, Calais (FR)

(73) Assignee: Renold, PLC, Manchester (GB)

( * ) Notice: Subject to any disclaimer, the term of this patent is extended or adjusted under 35 U.S.C. 154(b) by 0 days.

(21) Appl. No.: 09/976,370

(22) Filed: Oct. 11, 2001

(65) Prior Publication Data

US 2002/0094894 A1 Jul. 18, 2002

(30) Foreign Application Priority Data

Oct. 13, 2000 (GB) .............................................. 0025246

(51) Int. Cl.$^7$ ................................................ F16H 7/08
(52) U.S. Cl. ...................................... 474/110; 474/137
(58) Field of Search .............................. 474/110, 111, 474/136, 138

(56) References Cited

U.S. PATENT DOCUMENTS

| | | | | |
|---|---|---|---|---|
| 4,229,950 A | * | 10/1980 | Fessenden | 464/184 |
| 4,792,322 A | | 12/1988 | Goppelt et al. | 474/136 |
| 4,822,320 A | | 4/1989 | Suzuki | 474/111 |
| 4,985,009 A | * | 1/1991 | Schmidt et al. | 474/110 |
| 5,073,150 A | | 12/1991 | Shimaya | 474/110 |
| 5,704,860 A | | 1/1998 | Stief | 474/110 |

FOREIGN PATENT DOCUMENTS

| | | | | |
|---|---|---|---|---|
| DE | 1650620 | | 1/1970 | ............. F16H/7/08 |
| DE | 19580456 C1 | * | 5/1999 | ............. F16H/7/08 |
| EP | 0266565 | | 10/1987 | ............. F16H/7/08 |
| GB | 1018211 | | 6/1963 | |
| JP | 2000337461 A | * | 12/2000 | ............. F16H/7/08 |

* cited by examiner

*Primary Examiner*—David Fenstermacher
(74) *Attorney, Agent, or Firm*—Akin Gump Strauss Hauer & Feld, LLP

(57) ABSTRACT

A chain or belt tensioner comprises a plunger displaceable in a housing between retracted and extended positions. A stop ring between the plunger and housing frictionally contacts a smooth surface of the housing. A recess in the plunger has a tapered face for engagement with a bevelled surface of the stop ring. Inward movement of the plunger causes the tapered face to engage the stop ring and to force it to deform outwardly to a wedging position in which the stop ring is wedged between the tapered face and the surface thus preventing further inward movement of the plunger. The recess has a second face that engages the stop ring when the plunger moves out of the housing so as to slide it over the surface. The invention provides for a stop mechanism that enables retraction of the plunger to be prevented at an infinite number of positions.

23 Claims, 6 Drawing Sheets

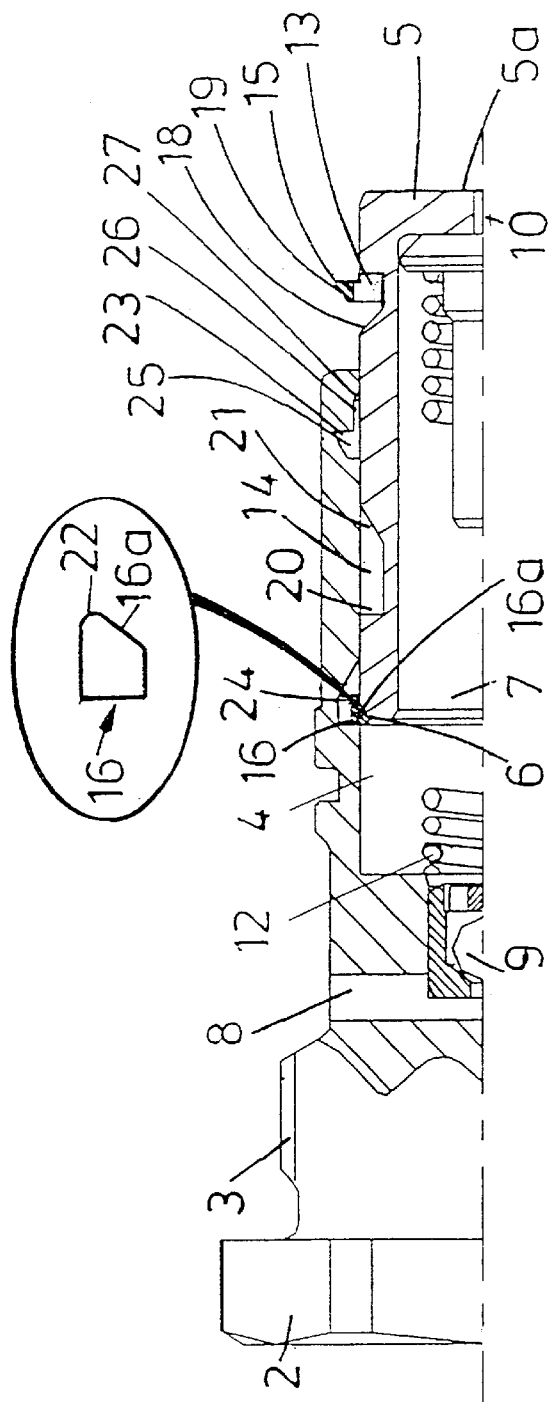
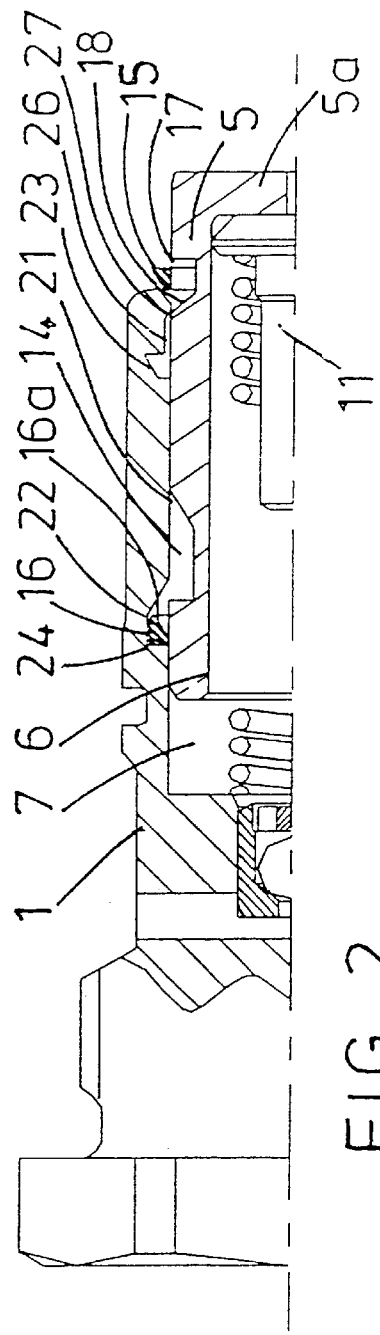
FIG. 1
FIG. 2

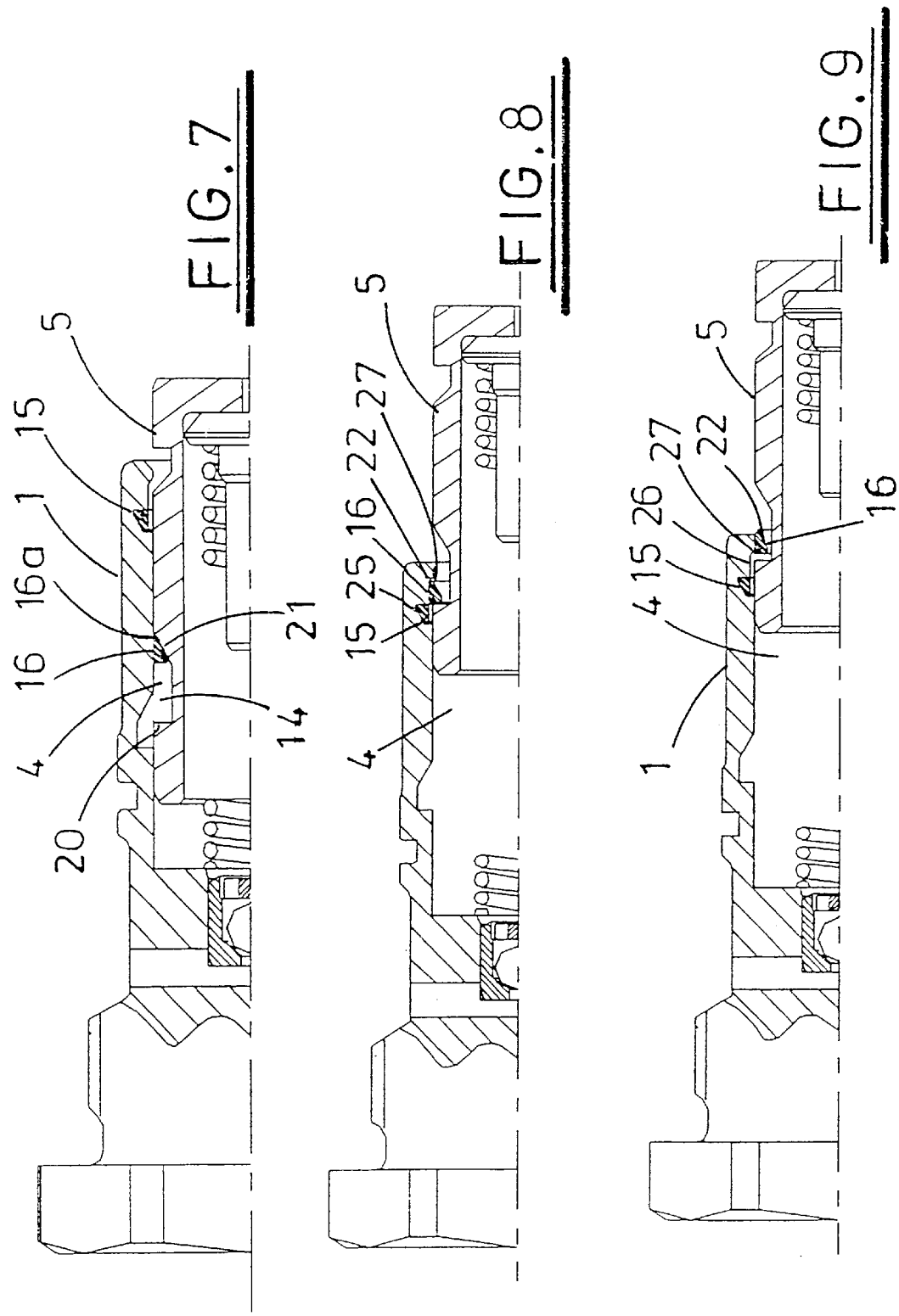

TENSIONER FOR A CHAIN OR BELT

CROSS-REFERENCE TO RELATED APPLICATIONS

This application claims priority under 35 U.S.C. § 119 to Great Britain Patent Application No. 0025246.0 filed Oct. 13, 2000.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND

1. Field of Invention

The present invention relates to a tensioner for a chain or belt and more particularly, but not exclusively, to a tensioner for imparting tension to a chain or belt used in a timing drive of an internal combustion engine of a vehicle.

2. Description of Related Art

Internal combustion engines of motor vehicles often include a timing belt or chain drive that passes over sprockets on the crankshaft and camshaft and is used to ensure that the camshaft is driven synchronously with the crankshaft. The tension in such a chain or belt varies considerably as a result of the expansion and contraction of engine components with temperature, torsional vibrations imparted from the crankshaft and camshaft, the engine speed and chain elongation as a result of chain wear or temperature variations in chain components. It is important to impart to and maintain tension in the chain or belt so as to reduce noise and the likelihood of the chain or belt jumping from the teeth of the sprockets.

Tensioners for chains or belts generally comprise a housing that defines an open-ended cylinder in which a plunger is slidably movable in a longitudinal direction and is biased outwardly of the cylinder by a coil spring so as to impart tension to the chain or belt. A variable volume fluid pressure chamber is defined between a hollow in the plunger and the cylinder walls. A check valve permits hydraulic fluid to pass from a source such as an oil pump into the pressure chamber but prevents passage of fluid in the reverse direction. The fluid in the pressurised chamber also serves to bias the plunger out of the cylinder towards the chain or belt.

The combined effect of the hydraulic fluid pressure and the coil spring biasing forces moves the plunger out of the housing and into contact with the chain or belt so as to take up the slack. An opposite resisting force is imparted from the chain to the plunger as a result of the tension induced in the chain by the drive. If the chain or belt is subjected to an increase in tension the resulting force applied to the plunger attempts to move it into the cylinder. However, such movement is prevented by the check valve which prevents the escape of hydraulic fluid out of the chamber. The incompressible nature of the hydraulic fluid prevents instant return movement of the plunger although a small annular clearance between the plunger and the cylinder wall may permit some fluid escape and limited slow retraction of the plunger.

When the internal combustion engine is idling or at rest there is little or no hydraulic fluid pressure and with insufficient fluid pressure in the chamber it is easier for the plunger to retract into the cylinder and for vibrations and noises to be transmitted from the chain. In order to address this problem it is common to provide a locking ratchet mechanism to prevent excessive retraction of the plunger even when the fluid pressure is low.

Known ratchet mechanisms for chain or belt tensioners comprise a rack defined on the plunger that is engageable by a pawl on the cylinder as described in U.S. Pat. Nos. 4,822,320 and 5,073,150. In an alternative embodiment a cylinder is provided with a helical toothed channel that is engageable by a pin on the plunger. The disadvantage of such ratchet mechanisms is that they are susceptible to poor performance and even jamming as a result of slight axial misalignment of the plunger in the chamber caused by the locking force is being applied on side only. Moreover, the components require careful machining that is relatively expensive to perform.

The tensioner described in U.S. Pat. No. 4,792,322 has a ratchet locking mechanism in which the locking force is applied uniformly around the plunger. It relies on the use of a radially resilient ring that moves between annular notches defined at axially spaced intervals in the interior wall of the cylinder. The ring serves to prevent excessive movement of the plunger into the cylinder by becoming trapped between an edge of the notch on the cylinder wall and a shoulder defined on the plunger. As the plunger extends out of the cylinder the ring is forced to move with it by contact with a stop face on the plunger whereupon it is moved into the next notch in the cylinder. The arrangement prevents retraction of the plunger but only to a predetermined number of discrete positions governed by the number of notches and their spacings. Like the other aforementioned ratchet designs, the locking of the plunger against retraction at discrete positions does not always ensure the appropriate tension is imparted to the chain.

U.S. Pat. No. 5,704,860 describes a chain tensioner having a radially resilient stop ring that co-operates with grooves in the wall of the plunger and housing. The ring is clamped between two contact surfaces on the housing and piston to lock the piston in the housing bore despite the urging force of a compression spring. If the piston is pushed into the housing the stop ring snaps into a groove so as to allow limited movement of the plunger in the housing. However, it does not move entirely clear of the plunger and further extension of the plunger encourages the stop ring to move along the housing.

EP 0260565 describes a chain tensioner in which a locking ring is radially resilient so that it is biased on to the plunger. It is moveable into a predetermined position where it is squashed between contact surfaces on the piston and housing and prevents extension of the plunger. However, it does not move clear of the plunger.

It is an object of the present invention to obviate or mitigate the aforesaid disadvantages.

BRIEF SUMMARY OF THE INVENTION

According to a first aspect of the present invention there is provided a chain or belt tensioner comprising a plunger displaceable in a bore of a housing between retracted and extended positions, the plunger projecting from an open end of the bore in said extended position and biased towards the extended position by a biasing member, a radially resilient stop member disposed in the bore between the plunger and housing and engaged in frictional contact with a first surface of the plunger or the housing, and a recess in the plunger or housing and defined on a second surface opposite the first surface, the recess having a tapered face for engagement with a surface of the stop member, wherein the tapered face tapers radially outwardly in the direction of towards the open end of said bore so that movement of the plunger relative to the housing towards the retracted position causes the tapered face to engage said surface of the stop member and to force it to deform in a radial direction to a wedging position in which the stop member is wedged between the tapered face and the first surface so as to prevent further inward movement of the plunger, the recess having a second surface that is engageable with the stop member when the plunger is moved out of the housing towards the extended position so as to slide the member over said first surface, wherein the first surface is of substantially constant diameter.

The present invention provides for a mechanism by which the inward movement of the plunger can be stopped at an infinite number of plunger positions relative to the housing. This is achieved by use of the radially resilient stop member in combination with the tapered surface of the recess. The arrangement permits the stop member to be wedged between the housing and the plunger at any axial position along the housing, the member, when wedged, being in increased frictional contact with the first surface so as to prevent significant retraction of the plunger into the housing. The first surface may be defined by the bore in which case the recess is defined in the plunger and the stop member is deformed radially outwardly to prevent further inward movement of the plunger. Alternatively the first surface may be defined on the plunger in which case the recess is in the housing and the member is deformed radially inwardly. The elimination of the plurality of annular grooves or ratchet teeth designs removes the step-wise nature of the previous ratchet mechanisms.

The outside diameter of the ring in a relaxed condition is preferably greater than the inside diameter of the bore. When the first surface is defined by the bore the stop member is thus disposed in the recess in the plunger in a radially contracted condition.

Ideally said surface of the stop member is ramped so as to co-operate with the tapered face of the recess.

The stop member may be in the form of a ring that may have a radial cut or slot so as to permit radial deformation.

The tensioner may additionally comprise a groove provided in said housing at one end of said bore, the groove having a tapered edge directed radially inwards in the direction towards the extended position for housing the stop member during initial assembly of the tensioner. The housing bore has an open end and a closed end, the plunger having a first end that is inserted into the bore towards the closed end during assembly and an annular surface between its first end and the stop member recess.

The first and second end faces of the recess are preferably spaced apart by a distance greater than the axial length of the stop member so as to permit travel of the recess over the member.

The leading edge of the stop member is preferably rounded at its radially outer extremity so as to assist in its removal from the housing.

A locking member may be provided between the plunger and housing, the member being radially resilient and having an outside diameter greater than the inside diameter of the bore, the housing and plunger having respective locking grooves for receipt of the locking member, wherein the plunger is moveable from a locked position in which the locking member is trapped between the respective locking grooves so as to prevent extension of the plunger and an unlocked position in which the locking member is received in a relaxed state in the locking groove of the housing such that it does not project into the bore of the housing and the plunger is able to move relative to the housing and locking member.

According to a second aspect of the present invention there is provided a chain or belt comprising a plunger displaceable in a bore of a housing between retracted and extended positions and biased towards the extended position by a biasing member, the housing having a first recess and the plunger having a second recess, the first recess having a locking edge, and a radially resilient locking member that is slidable with the plunger relative to the housing from a first position in which it is trapped between said first and second recesses and abuts the locking edge so as to prevent movement of the plunger out of the housing and a second position in which it is received in the first recess such that it is clear of the plunger and allows it to move relative to the housing in either direction between extended and retracted positions.

According to a third aspect of the present invention there is provided a chain or belt tensioner comprising a plunger for displacement in a bore of a housing between retracted and extended positions, the plunger projecting from an open end of the bore in said extended position and biased towards the extended position by a biasing member, the plunger having a leading end that is inserted into the bore of the housing during assembly of the tensioner, the leading end of the plunger or the end of the housing at the entry to the bore having a tapered surface that tapers inwardly in the direction of entry of the plunger into the bore, a radially resilient locking member disposed in a recess in the housing or the plunger, a first locking surface defined by the recess and a second locking surface defined on an opposing surface of the plunger or housing, wherein during insertion of the plunger into the housing bore the tapered surface engages the locking member and deforms it in a radial direction such that it rides over it and moves longitudinally relative to said opposing surface and engages said second locking surface whereupon subsequent attempted extension of the plunger out of the housing is limited to a position where the locking member is trapped between said first and second locking edges.

According to a fourth aspect of the present invention there is provided a method for arming a chain or belt tensioner, the tensioner comprising a plunger for displacement in a bore of a housing between retracted and extended positions, the plunger projecting from an open end of the bore in said extended position and biased towards the extended position by a biasing member, the plunger having a leading end that is inserted into the bore of the housing during assembly of the tensioner, the leading end of the plunger or the end of the housing at the entry to the bore having a tapered surface that tapers inwardly in the direction of entry of the plunger into the bore, a radially resilient locking member disposed in a recess in the housing or the plunger, a first locking surface defined by the recess and a second locking surface defined on an opposing surface of the plunger or housing, the method comprising the step of inserting the plunger into the housing bore such that the tapered surface engages the locking member and deforms it in a radial direction such that it rides over it and moves longitudinally relative to said opposing surface and engages said second locking surface whereupon subsequent attempted extension of the plunger out of the housing is limited to a position where the locking member is trapped between said first and second locking edges.

BRIEF DESCRIPTION OF DRAWINGS

A specific embodiment of the present invention will now be described, by way of example only, with reference to the accompanying drawings in which:

FIG. 1 is a partial longitudinal view of a tensioner of the present invention shown in part cross-section in an initial stage of assembly, the structure shown being symmetrical about the centre line;

FIGS. 2 and 3 are views corresponding to that of FIG. 1 and show subsequent stages in the assembly of the tensioner;

FIG. 7 is a view corresponding to previous views and shows the tensioner in a locked configuration;

FIGS. 8 and 9 are partial views in part cross-section showing dismantling of the tensioner;

DETAILED DESCRIPTION OF THE INVENTION

Figure 3:
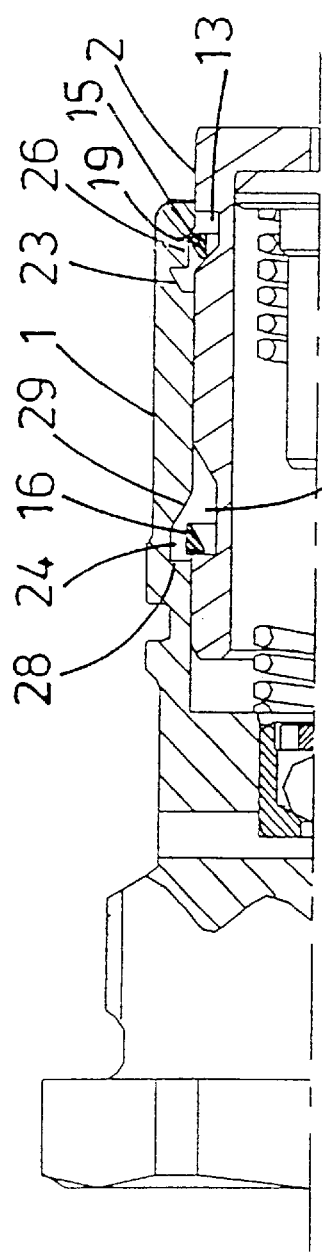

Referring now to the drawings, the exemplary chain tensioner has a body 1 that is designed to be inserted into a bore defined in an internal combustion engine cylinder block (not shown). To this end the body 1 has, at one end, a head 2 with a plurality of flats for engagement with an appropriate fastening tool and an adjacent threaded portion 3 by which the tensioner is screw-engaged in the engine bore.

The tensioner body 1 is generally cylindrical and has a blind bore 4 that is open at one end to receive a slidable hollow plunger 5. The exposed end 5a of the plunger 5 is closed and engageable with a movable chain guide or shoe (not shown). The other end of the plunger 5 has a chamfered outer edge 6 the purpose of which will become apparent later.

The interior of the bore 4 and the plunger 5 define a variable volume pressure chamber 7 that is filled with hydraulic oil. The chamber 7 is supplied with oil from an oil reservoir (not shown) via a passage 8 and a ball check valve 9. When the pressure of the oil supplied through the passage 8 exceeds that in the chamber 7 the ball is lifted from its check valve seat and permits passage of oil into the chamber 7. Conversely, when the oil pressure in the chamber 7 exceeds that of the supply the ball returns to its seat and the check valve 9 is closed so as to prevent escape of oil from the chamber 7.

The plunger 5 has a small central opening 10 at its closed end that serves as a vent for air and excess fluid in the pressure chamber 7 as is well known. The presence of any trapped air in the oil in the chamber 7 is undesirable and is vented to atmosphere via the vent opening 10. Access to the vent opening 10 is restricted by a venting plug 11 of known design so as to limit the escape of air and fluid.

A compression spring 12 is disposed coaxially between the closed end of the plunger 5 and the base of the housing bore 4 (for clarity only part of spring is shown in the figures) and serves to bias the plunger 5 outwards of the housing body 1 towards the chain so as to impart tension thereto.

The plunger 5 has two spaced annular grooves 13, 14 defined on its outer surface. A first groove 13 is defined near the closed end of the plunger 5 and is designed to receive an annular locking ring 15. A second groove 14 is disposed towards the opposite end of the plunger 5 and, in use, receives an annular stop ring 16.

The first groove 13 has a first end face 17 nearest the closed end of the plunger 5 and which extends in a substantially radial plane and a second end face 18 that is tapered radially inwardly in the direction towards the first face 17. The associated locking ring 15 has a radial slot to render it radially expansible or contractible and resilient such that it recovers its original diameter if forced to contract or expand. The ring 15 is of triangular or trapezoidal cross-section with a bevelled edge 19 facing the tapered end face 18 of the groove 13. The ring 15 may be manufactured from, for example, a material such as aluminum, steel or durable plastics.

The second annular groove 14 is longer in the axial direction of the tensioner than the first groove 13 and has a radially extending first end face 20 furthest from the closed end of the plunger 5 and a second end face 21 that is tapered radially outwardly in the direction towards the first groove 13. The associated stop ring 16 is of similar configuration to the locking ring 15 but is disposed in the tensioner in a reverse orientation i.e. with a bevelled edge 16a facing the tapered end face 21 of the groove 13 and has a rounded edge 22 at the radial extremity that faces towards the open end of the bore 4.

The interior surface of the body 1 that defines the bore 4 has two spaced annular grooves 23, 24 to correspond to those of the plunger 5. A locking groove 23 has a main portion 25 with a profile complementary to the locking ring 15 and is designed to receive the ring 15 such that it does not project radially therefrom. It has a leading shoulder 26 that is only marginally larger in diameter that the bore 4 and terminates in a ramped locking edge 27. A stop ring groove 24 has a radially extending end face 28 and a tapered end face 29 extending radially inwards in the direction towards the open end of the bore 4. The surface of the body 1 between the two grooves 23, 24 is relatively smooth and is free of notches or grooves.

To assemble or reset the tensioner the stop ring 16 is first placed in the stop ring groove 24 of the body 1 and the locking ring 15 is placed around the first groove 13 in the plunger 5. The inside diameter of the stop ring 16 is slightly less than that of the stop ring groove 24 such that it projects radially inwardly therefrom and the locking ring 15 is slightly larger in diameter than the first groove 13 on the plunger such that it projects radially outwards therefrom. The plunger 5 is pushed into the chamber 7 so that its chamfered edge 6 comes into abutment with the bevelled edge 16a of the stop ring 16 (FIG. 1). By virtue of the co-operation of the abutting edges 6, 16a further insertion of the plunger 5 forces the stop ring 16 to expand radially outwards into the stop ring groove 24 where it is held by the outer surface of the plunger 5 (FIG. 2) until it comes into alignment with the second groove 14 on the plunger 5 whereupon it relaxes radially into that groove 14 (FIG. 3). At the same time the locking ring 15 is forced into the bore 4 by deforming it radially inwardly so that it passes into the leading shoulder 26 of the locking ring groove 23 in the body 1 and is contracted into the first groove 13 in the plunger 5. At this point the plunger 5 is locked against movement out of the body 1 by the locking edge 27 and the tensioner may be inserted into the engine cylinder block with little risk of the plunger 5 falling out of the housing body 1 (FIG. 3).

Figure 4:
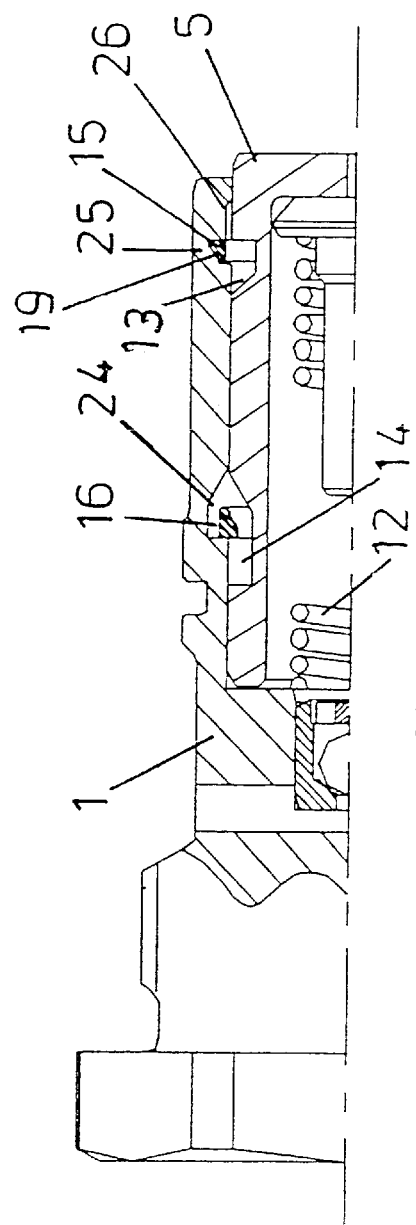
FIGS. 4 to 6 are views corresponding to that of FIG. 1 and show the release of a plunger of the tensioner.
Figure 5:
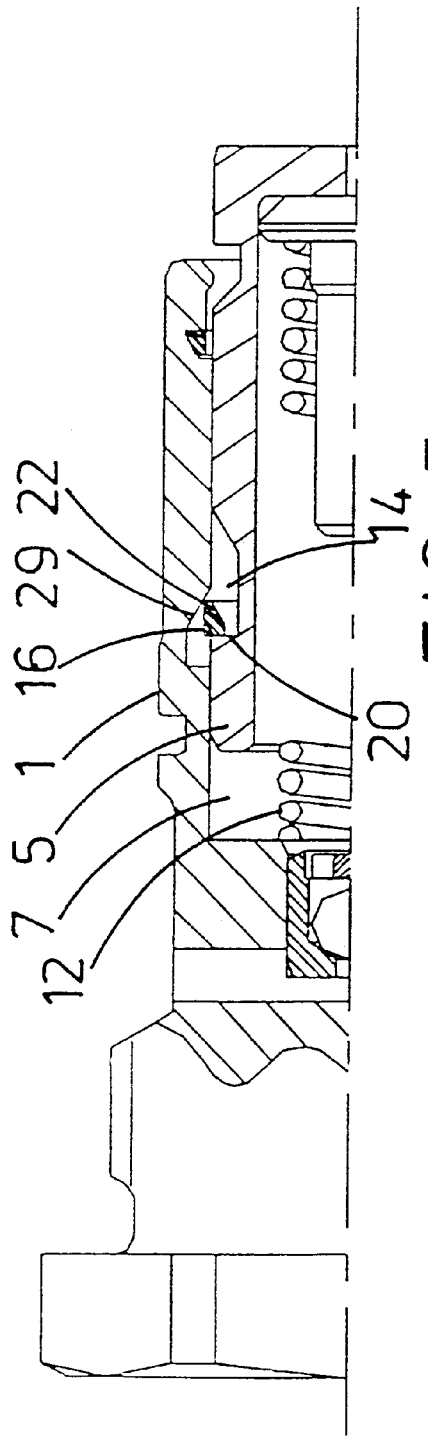
Figure 6:
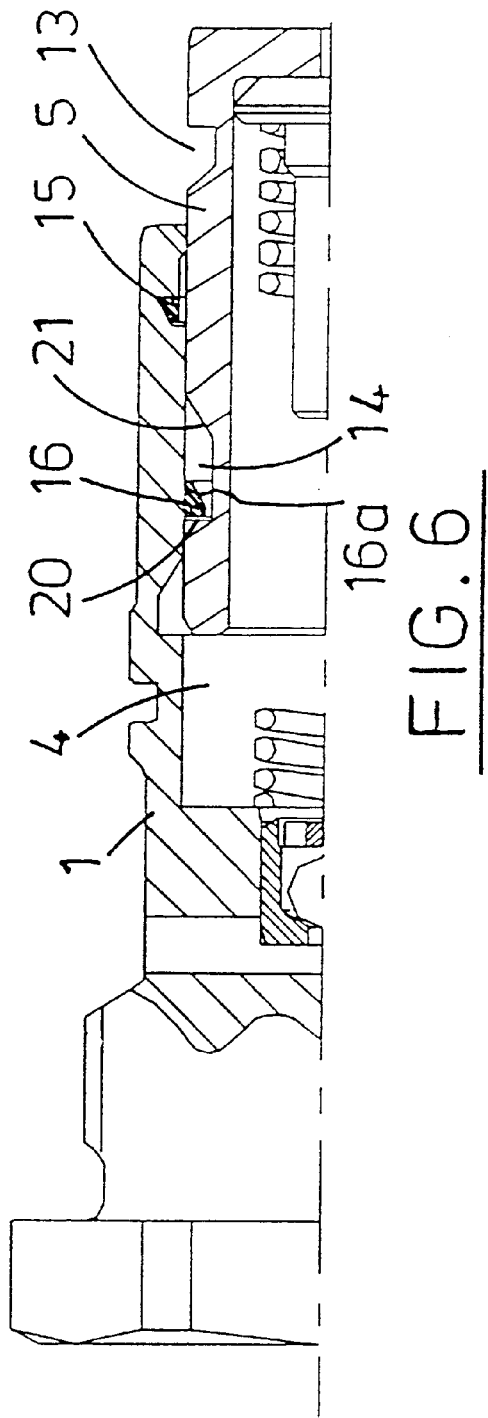

Once the tensioner is in placed in the engine, the plunger 5 is released by pushing it further into the body 1 until the locking ring 15 is brought into register with the main portion 25 of the locking ring groove 23 in the body 1 whereupon it relaxes radially and expands into the main portion 25 (FIG. 4). The plunger 5 is then free to extend out of the body 1 under the action of the biasing spring 12 and, when the engine is running, under the pressure of the hydraulic oil in the pressure chamber 7. The movement of the plunger 5 in this direction brings the first end face 20 of the second groove 14 in the plunger 5 into abutment with the stop ring 16 such that it is carried with the plunger 5 (FIG. 5). Continued extension of the plunger 5 brings the leading edge 22 of the stop ring 16 into abutment with the tapered second end face 29 of the stop ring groove 24 (see FIG. 5) and the ring 16 is forced to contract so that it is sandwiched radially between the smooth portion of the bore 4 and the second groove 14 in the plunger 5. In this position the stop ring 16 is in frictional contact with the housing but is free to slide over the smooth surface of the bore 4 in the direction of the open end so that it is carried by the plunger 5 during extension (FIG. 6). However, should the plunger 5 be forced to retract owing to a sudden increase in tension in the chain the second groove 14 of the plunger moves over the stop ring 16 (which is in frictional contact with the bore 4) thereby allowing a small inward movement of the plunger 5 until the tapered end face 21 of the groove 14 comes into abutment with the bevelled edge 16a of the stop ring 16. The tapered end face 21 acts as a cam surface to force the stop ring 16 radially outwards so that it is wedged against the smooth portion of the bore 2 and further inward movement of the plunger 5 is prevented by the increased frictional contact between the ring 16 and body 1 (FIG. 7).

When there is a sudden increase in chain tension and therefore load on the plunger the limited retraction of the plunger is restricted by virtue of the oil pressure in the chamber 7 and is only permitted by virtue of a limited flow of hydraulic oil via the vent 10 and plug 11. The retracting motion of the plunger 5 is thus damped by the oil. In the instance where the there is insufficient oil pressure in the chamber 7 such as during engine start-up or idling the stop ring 16 serves to prevent excessive retraction of the plunger 5.

In order to dismantle the tensioner for replacement, servicing or repair etc. the plunger 5 is pulled outwards so that the stop ring 16 travels over the bore 4 and the locking ring 15 in the locking groove 23 of the housing. It will be noted from FIG. 8 that the radial thickness of the locking ring 15 is closely matched to the depth of the main portion 25 of the locking ring groove 23 so that the stop ring 16 can travel over the locking ring 15 without difficulty until its rounded edge 22 comes into abutment with the locking edge 27 of the leading shoulder 26. Further pulling of the plunger 5 forces the rounded edge 22 of the stop ring 15 to ride over the ramped locking edge 27 of the shoulder thereby enabling the plunger 5 to be fully removed from the housing body 1 (FIG. 9).

It is to be understood that the locking ring may be omitted from the design or replaced by other locking means.

Figure 10:
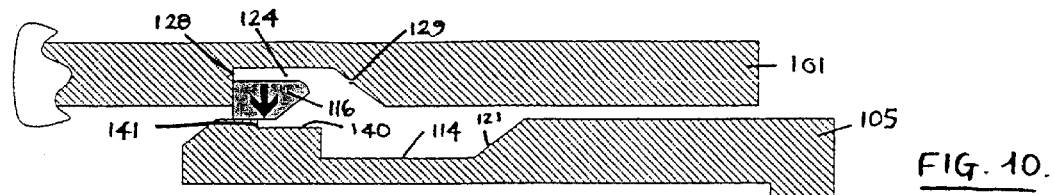
FIGS. 10 to 12 are views corresponding to those of FIGS. 2 to 4 showing a modified embodiment of the tensioner of the present invention.
Figure 11:
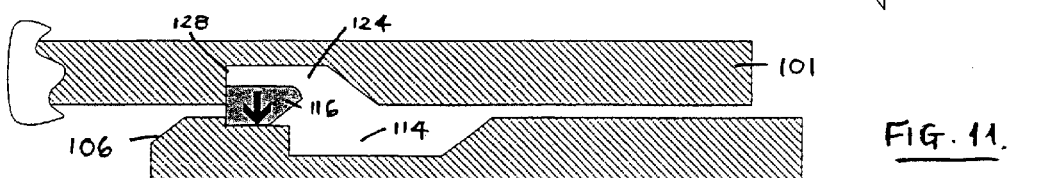
Figure 12:
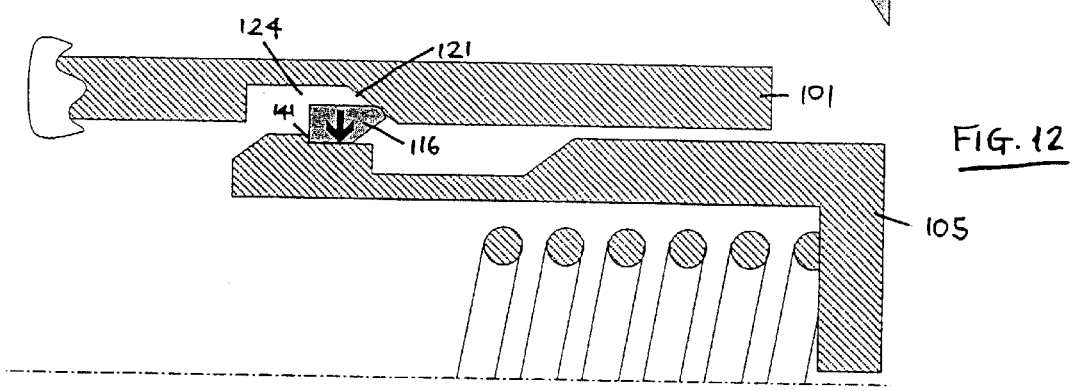

FIGS. 10 to 12 illustrate a modified tensioner in which the stop ring 116 operates as before but additionally performs the function of the locking ring.

The structure of the tensioner body 101 and the plunger 105 differs only in that the grooves 13 and 23 are eliminated and in that there is provided a shallow step 140 immediately adjacent the second groove 114 in the plunger 105 at the end opposite the tapered end face 121. The step 140 defines a stepped radially extending edge 141. The stop ring 116 is initially placed in the stop ring groove 124 and is loaded on to the plunger 105 by pushing the plunger inwardly of the body so that it rides over the chamfered end surface 106. FIG. 10 shows the stop ring 116 received in the stop ring groove 124 in the body 101. As the stop ring 116 abuts the end face 128 of the stop ring groove 124 further insertion of the plunger brings it into register with the step 140 (see FIG. 11). The tensioner is now armed such that if an attempt is made to remove the plunger 105 from the body 101 the leading edge of the stop ring 116 is trapped brought into contact with the tapered end face 129 of the stop ring groove 124 and the ring 116 trapped between it and the step edge 141 so that removal of the plunger is prevented as before (FIG. 12). This armed configuration is released as before by pushing the plunger into the tensioner body so that the stop ring 116 abuts the radially extending end face 128 of the stop ring groove 124 (as in FIG. 11) and is then forced to move into the groove 114 in the plunger 105 whereupon the tensioner is ready for use.

Figure 13:
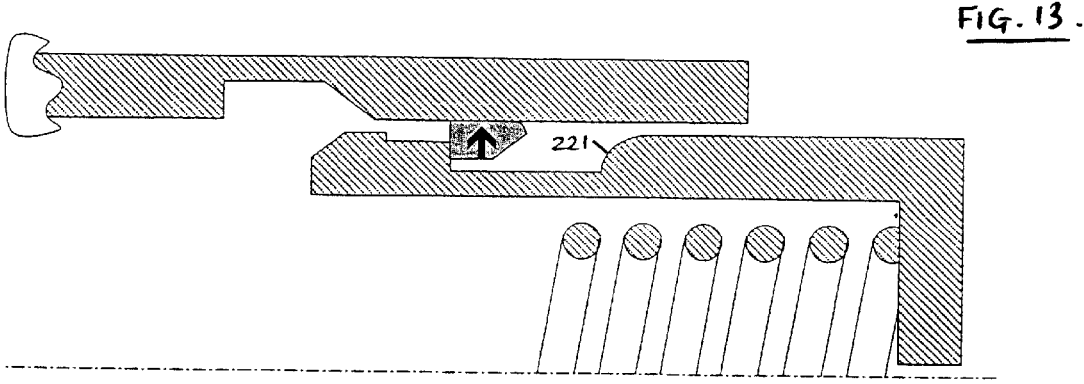
FIG. 13 is a partial sectioned view of an alternative tensioner embodiment.

It is to be understood that the tapered end faces 21, 121, 29, 129 of the grooves need not be planar as shown in FIGS. 1 to 12 but may be of any suitable smooth profile that reduces (or increases) in diameter. An example of an arcuate taper is shown at 221 in FIG. 13. Similarly the complementary bevelled surface on the stop or locking rings may also be other than planar.

Figure 14:
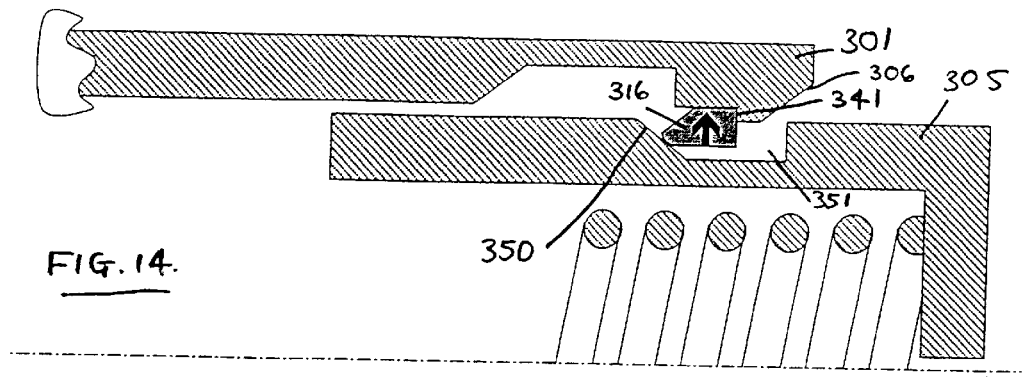
FIGS. 14 to 16 are views corresponding to those of FIGS. 3, 4 and 7 showing an alternative embodiment of the present invention.
Figure 15:
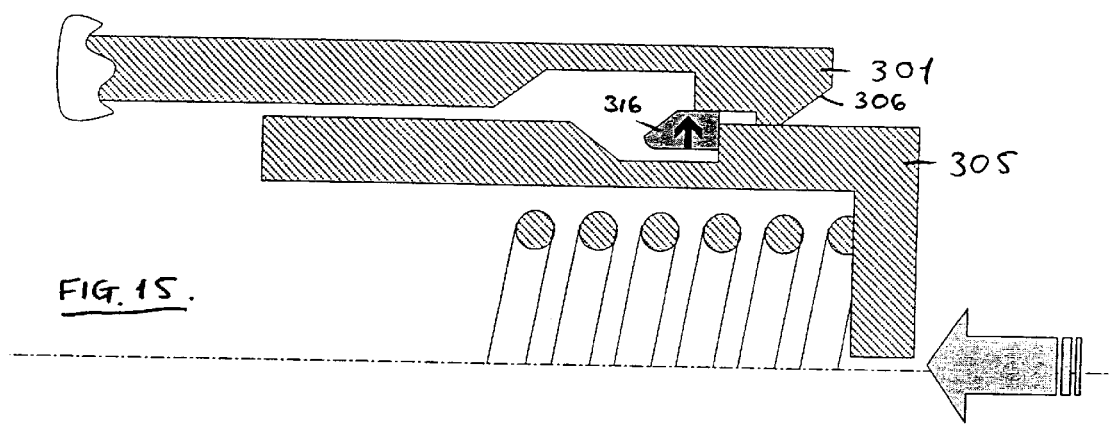
Figure 16:
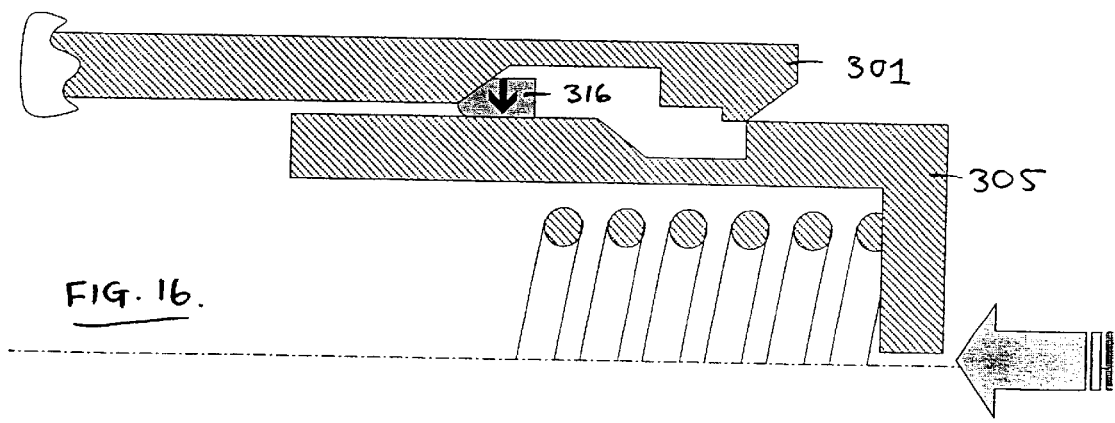

It will be appreciated that numerous modifications to the above described design may be made without departing from the scope of the invention as defined in the appended claims. For example, whilst the above described embodiment of the tensioner is used for tensioning a chain the same design may be used with minor modification to tension a belt. Moreover, the positions of the stop ring and associated groove may be reversed such that, in use, the stop ring is seated in a groove defined in the housing. In such an embodiment movement of the plunger out of the housing is permitted by virtue of it having a smooth surface that is able to slide over the stop ring (which has an inside diameter smaller than the outside diameter of the plunger) but retraction of the plunger into the housing is limited by the interaction of the bevelled surface of the ring with the tapered surface of the groove which forces the ring to contract radially on to the plunger in a wedging action. An example is shown in FIGS. 14 to 16. In FIG. 14 the tensioner is armed in that the stop ring 316 locks the plunger 305 relative to the body 301 between a stepped edge 341 on the body and a tapered end face 350 of a groove 351 in the plunger 305. The plunger is released as shown in FIG. 15 by pushing it inwardly of the body as indicated by the arrow. In FIG. 16 the plunger is shown in use and prevented from further retraction into the body by the wedging action of the stop ring. Again initial arming of the tensioner is achieved by inserting the plunger 305 into the housing 301 with the stop ring 316 in the groove 351. The ring 316 rides over the chamfered surface 306 defined on the housing at the bore entry and is moved to the stepped edge 341.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

What is claimed is:

1. A tensioner comprising
   a plunger displaceable in a bore of a housing between retracted and extended positions, the plunger projecting from an open end of the bore in the extended position and biased towards the extended position by a biasing member,
   a radially resilient stop member disposed in the bore between the plunger and housing and engaged in fictional contact with a first surface of either the plunger or the housing and a recess in the plunger or the housing and defined on a second surface opposite the first surface, the recess having a tapered face for engagement with a surface of the stop member,
   wherein the tapered face tapers radially outwardly in the direction towards the open end of the bore so that movement of the plunger relative to the housing towards the retracted position causes the tapered face to engage said surface of the stop member and to force the stop member to deform in a radial direction to a wedging position in which the stop member is wedged between the tapered face and the first surface so as to prevent further inward movement of the plunger, the recess having a second face that is engageable with the stop member when the plunger is moved out of the housing towards the extended position so as to slide the stop member over said first surface,
   wherein said first surface is of substantially constant diameters,
   wherein the stop member is generally wedge-shaped.

2. A tensioner according to claim 1, wherein in the wedging position the stop member engages the first surface with increased frictional contact.

3. A tensioner according to claim 1, wherein said surface of the stop member is ramped so as to co-operate with the tapered face of the recess.

4. A tensioner according to claim 1, wherein the stop member is in the form of a ring that has a radial cut or slot.

5. A tensioner according to claim 1, wherein the first surface is defined by the bore, the recess is defined in the plunger, and the stop member is radially outwardly deformed to said wedging position.

6. A tensioner according to claim 5, wherein the stop member, in a relaxed condition, has an outside diameter that is greater than the inside diameter of the bore.

7. A tensioner according to claim 5, further comprising a groove provided in said housing at one end of said bore, the groove having a tapered edge directed radially inwards in the direction towards the extended position and designed to receive the stop member during initial assembly of the tensioner.

8. A tensioner according to claim 5, wherein the plunger has a first end that is inserted into the bore during assembly and has an annular surface defined between its first end and the stop member recess.

9. A tensioner according to claim 5, wherein the tapered face and the second face of the recess are spaced apart by a distance greater than the axial length of the stop member.

10. A tensioner according to claim 5, wherein a leading edge of the stop member is rounded at its radially outer extremity so as to assist in its removal from the housing.

11. A tensioner according to claim 5, wherein a locking member is provided between the plunger and housing, the member being radially resilient and having an outside diameter greater than the diameter of the bore, the housing and the plunger having respective locking grooves for receipt of the locking member, wherein the plunger is moveable from a locked position in which the locking member is trapped between the respective locking grooves so as to prevent extension of the plunger and an unlocked position in which the locking member is received in a relaxed state in the locking groove of the housing such that it does not project into the bore of the housing and the plunger is able to move relative to the housing and locking member.

12. A tensioner according to claim 1, wherein the stop member also serves as a locking member to prevent extension of the plunger from the housing beyond a predetermined limit.

13. A tensioner according to claim 12, the housing having a first end at which the opening to the bore is defined and the plunger having a first end that is inserted into the bore, the plunger and the housing each having locking surface, wherein the stop member is movable between a first position where it is supported on a surface between said recess and the first end of the housing or plunger and is trapped between locking surfaces so as to prevent further extension of the plunger from the housing and a second position in which it is received in said recess and is clear of the locking surfaces.

14. A tensioner according to claim 1, wherein the second surface has a stepped edge and the first surface has a groove, the stop member being designed to be trapped between the stepped edge and an edge of the groove during initial assembly of the tensioner so as to prevent extension of the plunger from the housing.

15. A tensioner comprising a plunger displaceable in a bore of a housing between retracted and extended positions and biased towards the extended position by a biasing member, the plunger having an outside diameter, the housing having a first recess and the plunger having a second recess which has a diameter less than said outside diameter, the first recess having a locking edge, and a radially resilient locking member that is slidable with the plunger relative to the housing from a first position in which it is trapped between said first and second recesses and abuts the locking edge so as to prevent movement of the plunger out of the housing and a second position in which the locking member is received in the first recess such that the locking member is clear of the outside diameter of the plunger and allows the plunger to move relative to the housing in either direction between extended and retracted positions.

16. A tensioner according to claim 15, wherein the first recess comprises a first portion that is shaped to receive the locking member in the second position and a second portion disposed between the first portion and the locking edge and on which the locking member bears when in said first position.

17. A tensioner according to claim 16, wherein the first portion has a diameter greater than that of the second portion.

18. A tensioner according to claim 17, wherein the first portion has a profile that is complementary to the shape of the locking member.

19. A tensioner according to claim 15, wherein the second recess has a tapered surface against which locking member bears when in the first position, the tapered surface extending radially inwardly in the direction towards an open end of the housing and serving to deform the locking member radially outwardly into contact with the locking edge as the plunger attempts to move out of the housing.

20. A tensioner according to claim 15, wherein the looking member, in a relaxed condition, has an outside diameter that is greater than the diameter of the bore.

21. A tensioner according to claim 15, wherein the locking member is a ring with a radial slot or cut.

22. A chain or belt tensioner comprising a plunger for displacement in a bore of a housing between retracted and extended positions the bore having a first diameter, the plunger projecting from an open end of the bore in said extended position and biased towards the extended position by a biasing member, the plunger having an outside diameter substantially similar to said first diameter and a leading end that is inserted into the bore of the housing during assembly of the tensioner, the leading end of the plunger or an end of the housing at the open end of the bore having a tapered surface that tapers inwardly in the direction of entry of the plunger into the bore, a radially resilient locking member disposed in a first recess in the housing or the plunger, a first locking surface defined by the first recess, a second locking surface defined on an opposing surface of the plunger or housing, and a second recess defined in said opposing surface, said second recess having a depth that is not less than the depth of the locking member and which has a diameter greater or less than said outside diameter, wherein during insertion of the plunger into the housing bore the tapered surface engages the locking member and deforms it in a radial direction such that the locking member rides over the tapered surface and moves longitudinally relative to said opposing surface and engages said second locking surface whereupon subsequent attempted extension of the plunger out of the housing is limited to a locked position where the locking member is trapped between said first and second locking surfaces and retraction of the plunger into the housing from the locked position causes the locking member to be moved by the plunger or the housing over the opposing surface and into the second recess such that the locking member is clear of either the outside diameter of the plunger or the first diameter of the bore in the housing to permit relative movement of the plunder and housing.

23. A method for arming a chain or belt tensioner, the tensioner comprising a plunger for displacement in a bore of a housing between retracted and extended positions the bore having a first diameter, the plunger projecting from an open end of the bore in said extended position and biased towards the extended position by a biasing member, the plunger having an outside diameter substantially similar to said first diameter and a leading end that is inserted into the bore of the housing during assembly of the tensioner, the leading end of the plunger or an end of the housing at the open end of the bore having a tapered surface that tapers inwardly in the direction of entry of the plunger into the bore, a radially resilient locking member disposed in a first recess in the housing or the plunger, a first locking surface defined by the first recess, a second locking surface defined on an opposing surface of the plunger or housing, and a second recess defined in said opposing surface, said second recess having a diameter greater or less than said outside diameter, the method comprising the steps of inserting the plunger into the housing bore such that the tapered surface engages the locking member and deforms it in a radial direction such that the locking surface rides over the tapered surface and moves longitudinally relative to said opposing surface and engages said second locking surface whereupon subsequent attempted extension of the plunger out of the housing is limited to a looked position where the locking member is trapped between said first and second locking surfaces and retraction of the plunger into the housing from the locked position causes the locking member to be moved by the plunger or the housing over the opposing surface and into the second recess such that the locking member is then clear of either the outside diameter of the plunger or the first diameter of the bore in the housing to permit relative movement of the plunger and housing.

* * * * *